United States Patent
Fujimori et al.

(10) Patent No.: US 6,327,475 B1
(45) Date of Patent: Dec. 4, 2001

(54) SELECTIVE PAGER AND PAGING SYSTEM

(75) Inventors: Kazuhiko Fujimori; Yasushi Abe; Akihiko Wada; Keiko Ishii, all of Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/103,865

(22) Filed: Jun. 24, 1998

(30) Foreign Application Priority Data

Jun. 25, 1997 (JP) .................................................. 9-183220

(51) Int. Cl.⁷ ...................................................... H04Q 7/20
(52) U.S. Cl. ......................... 455/458; 455/460; 455/567
(58) Field of Search ................................. 455/458, 413, 455/567; 340/825.44, 825.47; 379/356, 353, 355, 361, 362

(56) References Cited

U.S. PATENT DOCUMENTS

| | | | |
|---|---|---|---|
| 4,856,047 | * 8/1989 | Saunders | 379/57 |
| 4,866,759 | * 9/1989 | Riskin | 379/97 |
| 4,879,758 | * 11/1989 | Deluca et al. | 455/296 |
| 4,882,729 | * 11/1989 | Lobel et al. | 370/85.1 |
| 5,031,206 | * 7/1991 | Riskin | 379/97 |
| 5,257,019 | * 10/1993 | Schwendeman et al. | 340/825.49 |
| 5,473,667 | * 12/1995 | Neustein | 379/57 |
| 5,533,107 | * 7/1996 | Irwin et al. | 379/201 |
| 5,583,921 | * 12/1996 | Hidaka | 379/93 |
| 5,640,682 | * 6/1997 | Wagai et al. | 455/38.2 |
| 5,732,133 | * 3/1998 | Mark | 379/355 |
| 5,923,733 | * 7/1999 | Binns et al. | 379/88.23 |
| 5,977,880 | * 11/1999 | Aoki | 340/825.44 |

FOREIGN PATENT DOCUMENTS

WO 92/08309 * 5/1992 (WO) ........................... H04M/1/272

* cited by examiner

*Primary Examiner*—Daniel Hunter
*Assistant Examiner*—C. Chow
(74) *Attorney, Agent, or Firm*—Pearne & Gordon LLP

(57) ABSTRACT

Group identification codes, names of parties to be sent, and telephone numbers of the pagers of the parties to be sent are stored in groups in memory 3 of a selective pager. At the time of transmission of a message, telephone numbers of a specified group and a message to be sent for the group are selected from the memory. The telephone numbers and the message are alternately sent to a DTMF signal generation section 8, which converts the telephone numbers and the message to DTMF signals. The DTMF signals are then converted into acoustic signals by means of a speaker 9 and are continually transmitted by way of a transmitter of a telephone set. As a result, a group call can be implemented without involving laborious operations, such as transmission of the telephone numbers and the message one by one.

8 Claims, 5 Drawing Sheets

SELECTIVE PAGER AND PAGING SYSTEM

BACKGROUND OF THE INVENTION

The present invention relates to a selective pager for use with a paging system, and more particularly, to a selective pager capable of effecting group paging or sending a message through group broadcast transmission.

In a paging system, when a telephone number of a selective pager is dialed by way of a telephone set, there is called a selective paging base station, which radios an individual number of a selective pager corresponding to the telephone number. Upon receipt of the individual number, a beeper of the selective pager is activated. To send a message to the selective pager, the message is transmitted in the form of a DTMF signal by way of the telephone set, and the message appears on a display of the selective pager.

To simplify operations which involve pressing of push buttons to send a telephone number or a message, an existing selective pager of the paging system is provided with a DTMF signal generation circuit. A telephone number is converted into a DTMF signal, and the thus-converted DTMF signal is sounded from a speaker of the pager. Alternatively, a telephone number and a message are converted into a DTMF signal, and the thus-converted DTMF signal is sounded from the speaker. By means of the thus-converted DTMF signal, the telephone number is automatically dialed by way of a transmitter of the telephone set.

To simplify operations required to call a plurality of selective pagers, a group broadcast transmission is carried out, wherein a single message is transmitted from the base station of the paging system to the selective pagers having identical addresses.

In the existing paging system set forth, in order to effect group transmission from the base station, a paging system service provider must writes a group call address into the selective pagers. Further, the group call service is effectively resident solely within the paging system of the same service provider. Consequently, a group of selective pagers across a plurality of paging service systems cannot be paged at the same time.

To send a single message data set to a plurality of selective pagers through use of the DTMF transmission function of the selective pager, the user of the selective pager must repeatedly perform call-originating operations several times. Specifically, after the telephone number of a party to be paged has been transmitted from a DTMF signal generation circuit, the message data set is transmitted from the DTMF signal generation circuit. Further, the telephone number of the party to be paged and the message data set are transmitted from the DTMF signal generation circuit. A round of these operations must be repeated. As mentioned above, in any case, many problems are encountered in realizing a group call.

SUMMARY OF THE INVENTION

The present invention is intended to solve the problems encountered in the existing selective pager making a group call. The object of the present invention is to provide a selective pager capable of paging a plurality of selective pagers or transmitting a single message to a plurality of pagers through simple operations.

To solve the foregoing problem, a selective pager according to the present invention is arranged so as to assign a group identification code both to telephone numbers of pagers of parties to be paged to which a message is to be sent through group transmission and to data regarding the names of the parties to be paged, and to store the telephone numbers and the data into memory in a grouped manner, whereby the telephone numbers and a message are continually, automatically, and alternately generated by means of DTMF signal generation means.

A selective paging base station is arranged so as to temporarily store into memory a plurality of telephone numbers and a message received by way of a telephone line and to send the message to a plurality of selective pagers.

With the foregoing configuration, a plurality of pagers of parties to be sent can be paged through a group call without involving laborious actuation of the selective pager.

According to the present invention, a selective pager comprises: memory for storing data sets regarding telephone numbers of parties to be paged while the data sets are assigned a group identification code; means for specifying a group of parties to be paged; means for selecting from the memory a plurality of telephone number data sets regarding a specified group of parties to be paged, according to the group identification code; means for generating a DTMF signal; means for sequentially outputting the selected plurality of telephone number data sets to the DTMF signal generation means; and a speaker for converting into acoustic signals DTMF signals received from the DTMF signal generation means. So long as a group of parties to be paged are selected, the foregoing selective pager continually selects the individual telephone numbers of the group and dials the telephone numbers through generation of a DTMF signal.

Further, a selective pager comprises: memory for storing data regarding telephone numbers of parties to be sent while the data sets are assigned a group identification code; message memory for storing transmission messages; means for specifying a group of parties to be sent; means for specifying one of the transmission messages; means for selecting from the memory a plurality of telephone number data sets regarding a specified group of parties to be sent, according to the group identification code; means for selecting the thus-specified transmission message from the message memory; means for generating a DTMF signal; means for sequentially outputting the selected plurality of telephone number data sets to the DTMF signal generation means; and a speaker for converting into acoustic signals DTMF signals received from the DTMF signal generation means. So long as a group of parties to be sent and a transmission message are selected, the foregoing selective pager selects the group's telephone numbers and a transmission message and makes a group call through alternate generation of DTMF signals.

According to the present invention, a method of controlling transmission of a selective pager comprises the steps of: storing into memory data regarding telephone numbers of received parties input from an operation section of the selective pager while the data are assigned a group identification code; selecting from the memory a plurality of telephone number data sets regarding the group of parties to be sent as specified by the operation section according to the group identification code; sequentially converting the thus-selected plurality of telephone number data sets into DTMF signals; and converting the DTMF signals into acoustic signals. So long as a group of parties to be sent is selected, under the foregoing method the individual telephone numbers of the group are continually selected and dialed through generation of a DTMF signal.

Further, according to the present invention, a method of controlling transmission of a selective pager comprises: the steps of: storing into memory data regarding telephone numbers of received parties input from an operation section of the selective pager while the data are assigned a group identification code; storing into message memory transmission messages input from the operation section; selecting a plurality of telephone number data sets regarding the group of parties to be sent as specified by the operation section from the memory according to the group identification code; selecting from the message memory the transmission message specified by the operation section; sequentially and alternately converting the thus-selected plurality of telephone number data sets and the transmission message into DTMF signals; and converting the DTMF signals into acoustic signals. So long as a group of parties to be sent and a transmission message are selected, under the foregoing method the group's telephone numbers and a transmission message are selected and transmitted through a group call by alternately producing DTMF signals.

According to the present invention, a selective paging base station comprises: means for receiving telephone numbers via a telephone line; memory for storing a plurality telephone numbers thus received; and a radio transmission section which sequentially pages a plurality of selective pagers corresponding to the plurality of telephone numbers. The selective paging base station has an effect of continually receiving telephone numbers of a plurality of selective pagers and continually paging the pagers.

Further, a selective paging base station comprises: means for receiving telephone numbers and messages via a telephone line; memory for storing the plurality of telephone numbers and messages thus received; and a radio transmission section which sequentially pages a plurality of selective pagers corresponding to the plurality of telephone numbers and which sequentially transmits the messages to the pagers. The selective paging base station has an effect of continually receiving telephone numbers of and messages for a plurality of selective pagers and of continually transmitting the messages to the pagers.

A present invention is directed to a paging system comprising a plurality of selective paging receivers and at least one of a selective paging base station as mentioned above. Particularly, the paging system comprises: a selective pager comprising: memory for storing data sets regarding telephone numbers of parties to be paged while the data sets are assigned a group identification code; means for specifying a group of parties to be paged; means for selecting from the memory a plurality of telephone number data sets regarding a specified group of parties to be paged, according to the group identification code; means for generating a DTMF signal; means for sequentially outputting the selected plurality of telephone number data sets to the DTMF signal generation means; and a speaker for converting into acoustic signals DTMF signals received from the DTMF signal generation means; and a selective paging base station comprises: means for receiving telephone numbers via a telephone line; memory for storing a plurality telephone numbers thus received; and a radio transmission section which sequentially pages a plurality of selective pagers corresponding to the plurality of telephone numbers. The paging system has an effect of a base station being able to continually receive a plurality of telephone numbers and to page a plurality of selective pagers.

Moreover, a paging system comprising: a selective pager comprising: memory for storing data regarding telephone numbers of parties to be sent while the data sets are assigned a group identification code; message memory for storing transmission messages; means for specifying a group of parties to be sent; means for specifying one of the transmission messages; means for selecting from the memory a plurality of telephone number data sets regarding a specified group of parties to be sent, according to the group identification code; means for selecting the thus-specified transmission message from the message memory; means for generating a DTMF signal; means for sequentially outputting the selected plurality of telephone number data sets to the DTMF signal generation means; and a speaker for converting into acoustic signals DTMF signals received from the DTMF signal generation means; and a selective paging base station comprises: means for receiving telephone numbers and messages via a telephone line; memory for storing the plurality of telephone numbers and messages thus received; and a radio transmission section which sequentially pages a plurality of selective pagers corresponding to the plurality of telephone numbers and which sequentially transmits the messages to the pagers.

The paging system has an effect of a sender being able to continually dial telephone numbers of and messages for a group of parties to be sent and a base station being able to send the message to the plurality of selective pagers.

DETAILED DESCRIPTION OF THE PREFERRED EMBODIMENTS

Embodiments of the present invention will be hereinafter described in detail by reference to FIGS. 1 through 6.
(First Embodiment)

A first embodiment of the present invention relates to a selective pager which selects from telephone directory memory data regarding telephone numbers of a group of parties to be sent, according to a group identification code and which sequentially converts the thus-selected data into DTMF signals and outputs the signals from a speaker.

Figure 1:
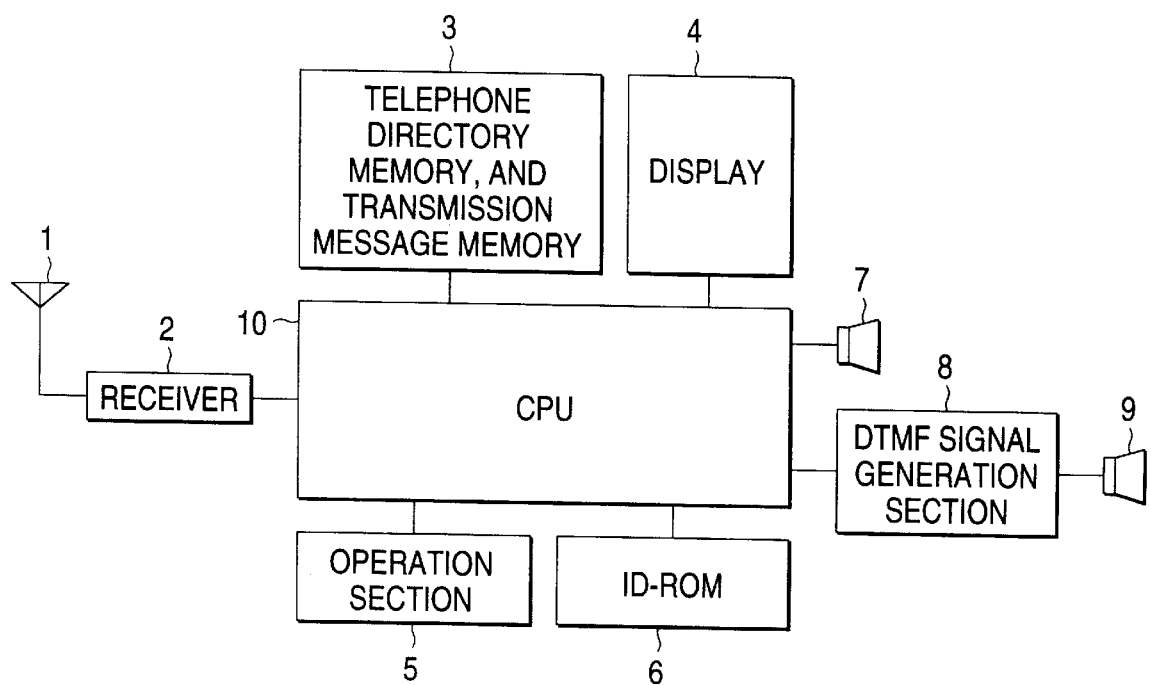
FIG. 1 is a block diagram showing a selective pager according to a first or second embodiment of the present invention.

FIG. 1 is a block diagram showing the configuration of a selective pager according to the first embodiment. In FIG. 1, an antenna 1 receives a radio signal from a paging system. A receiver 2 is a radio signal receiving section which detects the radio signal received by the antenna 1 and which demodulates and converts the thus-detected signal into a digital signal. Memory 3 stores telephone directory data and transmission messages. A display 4 indicates a received message or system information. An operation section 5 permits entry of data to be registered or provision of a transmission instruction. An ID-ROM 6 is read-only memory for storing a pager's identification number (or address). A beeper 7 informs a user of the pager's operation by sound. A DTMF signal generation section 8 converts a telephone number or a message into a multi-frequency dial signal. A speaker 9 converts the signal generated by the DTMF signal generation section 8 into an acoustic signal. A CPU 10 controls the overall pager.

Figure 2:
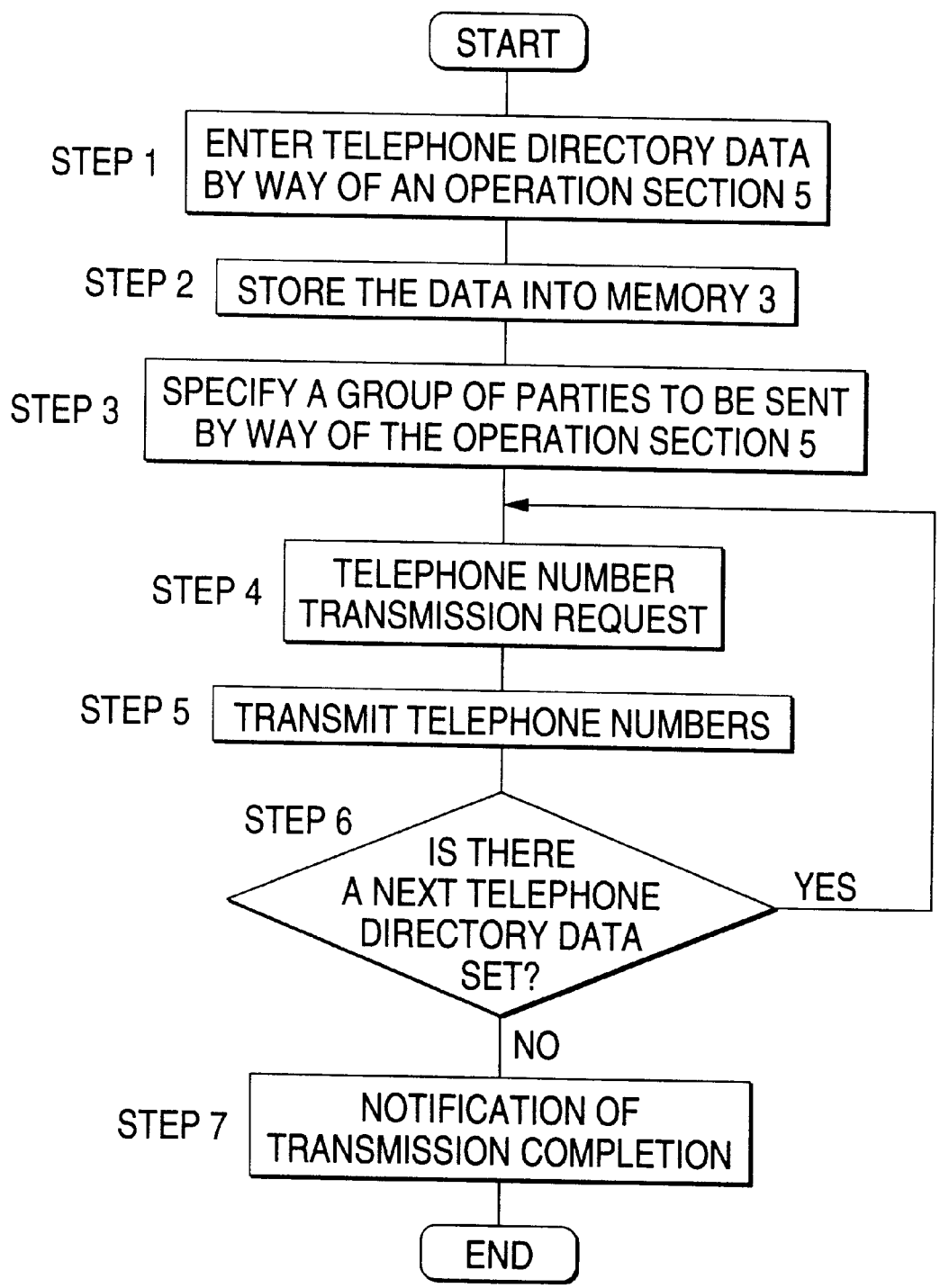
FIG. 2 is a flowchart relating to the operation of the selective pager according to the first embodiment.

The operation of the pager having the foregoing configuration will be described by reference to a block diagram provided in FIG. 1, a flowchart provided in FIG. 2, and an operation flow provided in FIG. 3.

A telephone directory data set comprising the name of a party to be paged and his telephone number is entered by way of the operation section 5 of the selective pager (step 1), and the thus-entered data set is stored into the data storage memory 3 (step 2). At this time, the name of the party to be paged included in the telephone directory data set is registered while being assigned a code for the purpose of identifying the group of the party. With regard to a group identification code, one party to be paged may be registered while being assigned a plurality of group identification codes. Further, not only one group but also a plurality of groups can be selected at the time of transmission of a message.

At the time of transmission of a message, by way of the operation section 5 the user specifies a group of parties to be paged (step 3), and a DTMF signal transmission instruction is activated. Upon receipt of a telephone number transmission request from the operation section 5 (step 4), the CPU10 retrieves a telephone number data set from the specified group and sends one telephone number data set selected from the group (step 5). After completion of transmission of one data set, the CPU 10 enters a pause state in order to wait for the user to check completion of transmission of a telephone number.

To transmit the next data set (YES in step 6), the CPU 10 receives again a telephone number transmission request from the operation section 5 (step 4) and transmits a retrieved data set (step 5). The transmission signal is converted into a multi-frequency dial signal by means of the DTMF signal generation section 8, and the multi-frequency dial signal is further converted into an acoustic signal by means of the speaker 9. The acoustic signal can be transmitted from a transmitter of a telephone set through an automatic dialing operation. If the next telephone number data set is absent (NO in step 6), the CPU 10 informs the user of absence of data by way of the display 4 (step 7).

Figure 3:
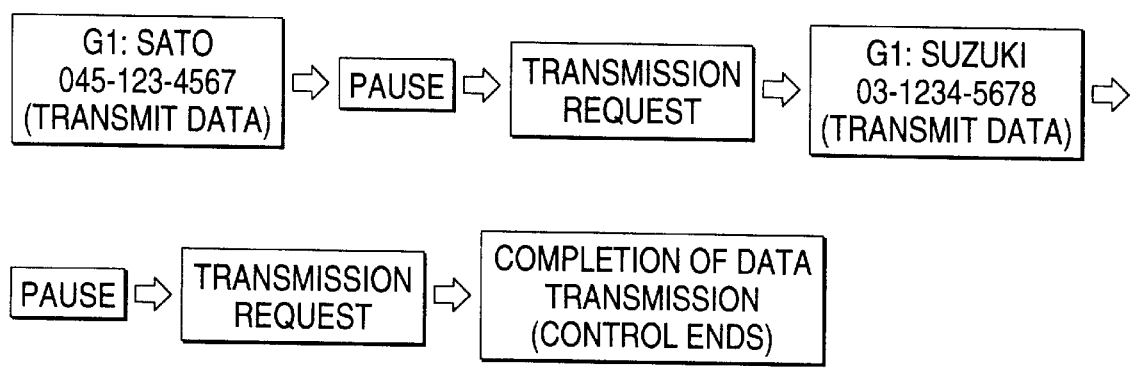
FIG. 3 is an example of operation of the selective pager according to the first embodiment.
Figure 4:
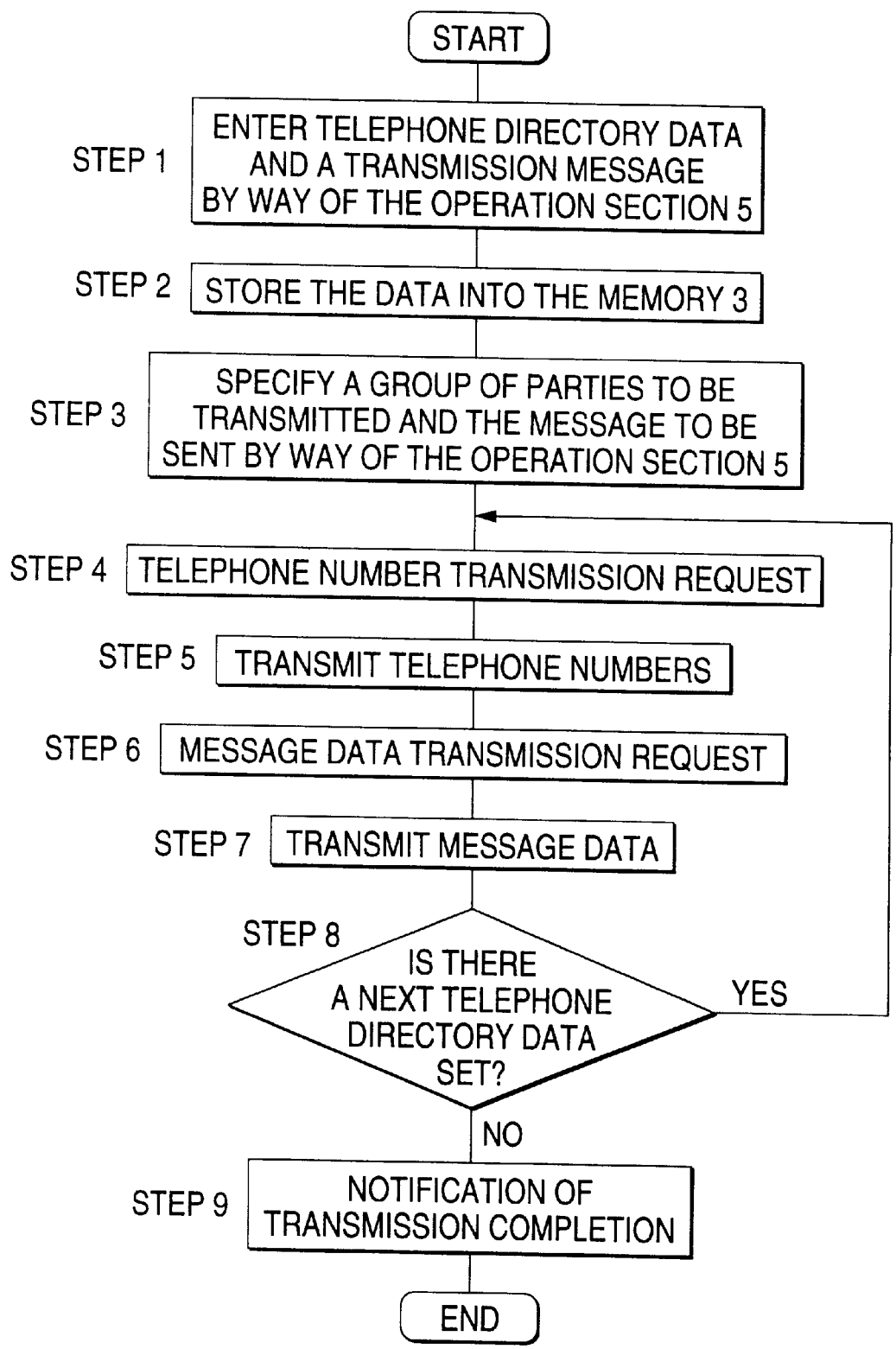
FIG. 4 is an operation flowchart of the selective pager according to the second embodiment.

As shown in FIG. 3, assuming that a data set of group No.1 (G1), i.e., "G1: Sato/045-123-4567," is stored in memory No.1 and that another data set, i.e., "G1: Suzuki/03-123-4567," is stored in memory No. 2, a message "G1: Sato/045-123-4567" appears on the display 4 at the time of a transmission operation. Only the telephone number "045-123-4567" is output from the DTMF signal generation section 8. After the transmission of the telephone number, the CPU enters a pause state. When a transmission request is entered by way of the operation section 5, the next message "G1: Suzuki/03-1234-5678" appears on the display 4, and only the telephone number "03-1234-5678" is output from the DTMF signal generation section 8. The foregoing operations are repeated until the data of the group G1 are depleted. When the data are depleted, a transmission completion acknowledgment is displayed, and the transmission operation ends.

As has been mentioned above, the selective pager according to the first embodiment of the present invention is arranged so as to select from the telephone directory memory telephone number data sets of the group of parties to be paged, according to the group identification code and to sequentially convert the data sets into DTMF signals. The thus-converted DTMF signals are output from the speaker.

The foregoing configuration enables a group call, wherein telephone numbers of a specified group from among the plurality of telephone numbers registered in the selective pager are continually dialed.

(Second Embodiment)

A second embodiment of the present invention relates to a selective pager which selects from the telephone directory memory data regarding telephone numbers of a specified group and selects a specified transmission message from the message memory. The thus-selected telephone number data sets and the transmission message are sequentially and alternately converted into DTMF signals and output by way of the speaker.

The selective pager according to the second embodiment differs from that according to the first embodiment in that a single message is sent to a plurality of parties to be paged. The operation of the selective pager according to the second embodiment will be described by reference to the block diagram provided in FIG. 1, a flowchart provided in FIG. 4, and an operation chart provided in FIG. 5. The selective pager according to the second embodiment is the same in principal configuration as that according to the first embodiment.

A telephone directory data set comprising the name of a party to be paged and his telephone number is entered by way of the operation section 5 (step 1), and the thus-entered telephone directory data set is stored in the data storage memory 3 (step 2). At this time, the name of the party to be paged included in the telephone directory data set is registered while being assigned a code for the purpose of identifying the group of the party. Next, a data set regarding a message to be sent to the group is entered by way of the operation section (step 1), and the thus-entered data set is stored into the data storage memory 3 (step 2). One message data set to be sent may be registered for each group. Alternatively, a plurality of messages are stored for one group beforehand, and one of the messages may be selected and sent.

After storage of the telephone directory data set and the transmission message into the data storage memory 3, by way of the operation section 5 the user specifies a group of parties to be transmitted and a message data set to be transmitted (step 3), and a DTMF signal transmission instruction is activated by entry of a telephone number transmission request by way of the operation section 5 (step 4). Upon receipt of an activation request, the CPU10 retrieves a telephone number data set from the specified group and alternately sends a telephone number data set and a transmission message selected from the group (steps 5 through 7). After completion of transmission of one telephone number data set, the CPU 10 enters a pause state in order to wait for the user to check completion of transmission of a telephone number. In response to a message data transmission request from the user (step 6), the CPU 10 transmits a transmission message (step 7). The transmission message is converted into a multi-frequency dial signal by means of the DTMF signal generation section 8, and the multi-frequency dial signal can be transmitted from the speaker 9 through an automatic dialing operation.

In a case where there is a next transmission data set (YES in step 8), the CPU 10 transmits the next telephone number data set (step 5) upon receipt of the next telephone number transmission request (step 4). In a case where there is no transmission data set after completion of transmission of the message (NO in step 8), the CPU 10 informs the user of absence of data by way of the display 4 (step 9) and terminates the operation.

Figure 5:
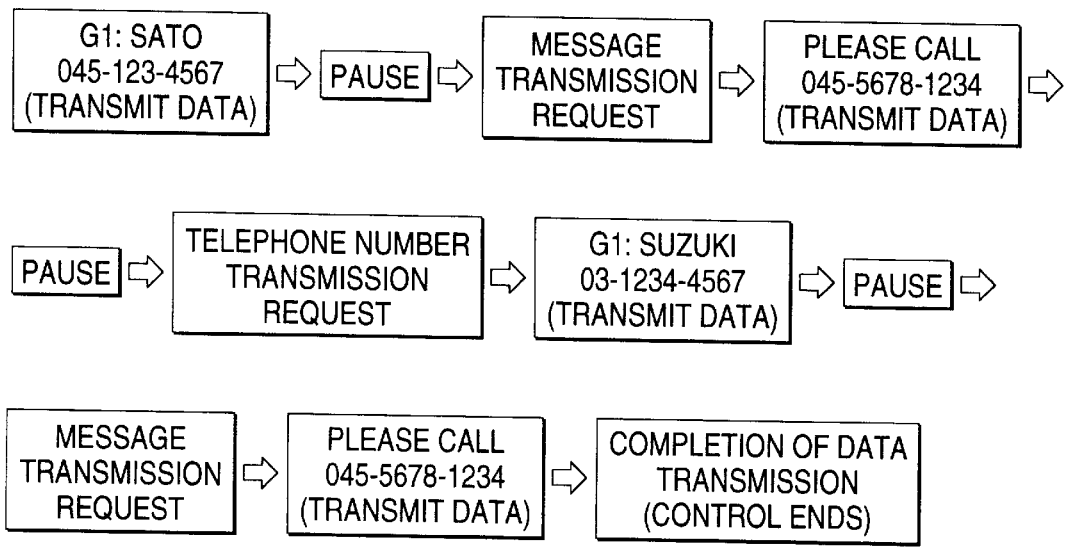
FIG. 5 is an example of operation of the selective pager according to the second embodiment.

As shown in FIG. 5, assuming that a data set of group No.1 (G1), i.e., "G1: Sato/045-123-4567," is stored in memory No.1; that another data set, i.e., "G1: Suzuki/03-123-4567" is stored in memory No. 2; and that a message "Please dial 045-5678-1234," a message "G1: Sato/045-123-4567" appears on the display 4 at the time of a transmission operation. Only the telephone number "045-123-4567" is output from the DTMF signal generation section 8. When a message transmission request is input after a pause, a message "Please dial 045-5678-1234" appears on the display 4. Subsequently, the message "Please dial 045-5678-1234" is transmitted by means of the DTMF signal generation section 8. The foregoing operations are repeated until the data of the group G1 are depleted. When data have been depleted, a transmission completion acknowledgment is displayed, and the transmission operation ends.

As has been mentioned above, the selective pager according to the second embodiment of the present invention is arranged so as to select from the telephone directory memory a telephone directory data set of a specified group and to select a specified message from the message memory; to sequentially and alternately convert into DTMF signals the thus-selected telephone number data set and the transmission message; and to output the DTMF signals from the speaker. The foregoing configuration enables group broadcast transmission, wherein a single message is continually transmitted to a plurality of telephone numbers of the specified group among the plurality of telephone numbers registered in the selective pager.

Although in the first and second embodiments the telephone directory data are grouped by assignment of an identifier to the names of parties to be sent included in the telephone directory data, the group may be managed by preparation of a table relating to correspondence between a group identifier and telephone numbers within another memory location.

(Third Embodiment)

A third embodiment of the present invention relates to a selective paging base station which temporarily stores into memory a plurality of telephone numbers and a message received by way of a telephone line and which continually transmits the message to the plurality of selective pagers.

Figure 6:
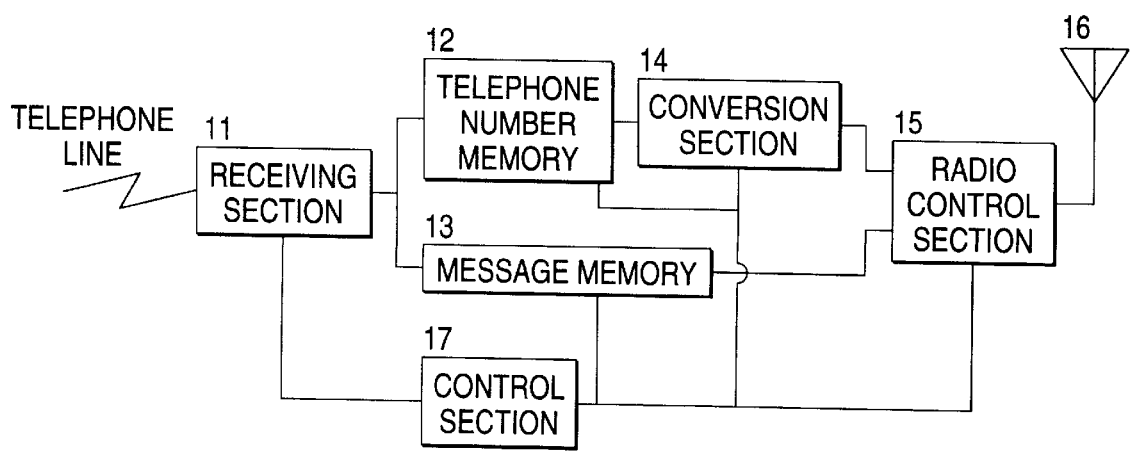
FIG. 6 is a block diagram showing a selective pager base station according to a third embodiment of the present invention.

FIG. 6 is a block diagram showing the configuration of a selective paging base station according to the third embodiment. A receiving section 111 receives telephone numbers and a message by way of a telephone line. Telephone number memory 12 stores the thus-received telephone numbers. Message memory 13 stores the thus-received message. A conversion section 14 converts the telephone number into a paging signal. A radio transmission section 15 converts the paging signal and the message into radio signals. An antenna 16 transmits the paging signal and the message by radio. A control section 17 is a CPU which controls the overall base station.

Next, the operation of the selective paging base station will be described. When the telephone number of the selective pager is dialed, the selective paging base station is called. Usually, the radio transmission section 15 transmits a paging signal of a selective pager corresponding to this telephone number. When a message is input in the form of a DTMF signal while the telephone set is held in communication with the base station, the thus-received message is stored in the message memory 13. Further, when a telephone number is input in the form of a DTMF signal, the thus-entered telephone number is stored in the telephone number memory 12. When another telephone number is continually entered without input of a message, this telephone number is also stored in the telephone number memory 12. In short, when telephone numbers are continually entered, the first-entered telephone number and another telephone number entered in the form of a DTMF signal are stored in the telephone number memory 12. In contrast, in a case where a message and a telephone number are alternately entered, the first-entered telephone number and another telephone number entered in the form of a DTMF signal are stored in the telephone number memory 12, and the message is stored in the message memory 13.

After completion of receipt of telephone numbers and a message, the telephone numbers are read from the telephone number memory 12 one after another, and each thus-read telephone number is converted, by means of the conversion section 14, into a paging signal of a selective pager corresponding to the telephone number. The paging signal is then transmitted from the radio transmission section 15. If there is a message, the message is read from the message memory 13 and is subsequently transmitted to the paging signal from the radio transmission section 15.

So long as a paging system is configured by combination of the selective paging base station according to the third embodiment and the selective pager according to the first or second embodiment, the paging system is capable of transmitting a message to one selective pager, as in the case of an existing paging system, as well as to continually page a group of selective pagers or to transmit a single message to a group of selective pagers by way of a simple operation.

As has been described above, the selective paging base station according to the third embodiment is arranged so as to temporarily store a plurality of telephone numbers and a message received by way of a telephone line and to continually transmit the message to the plurality of selective pagers, thus enabling continual transmission of the message to the plurality of selective pagers by way of a telephone.

As has been mentioned, the present invention yields an advantage of providing the ability to readily transmit a message to a group of parties by selection of telephone numbers of a specified group from grouped telephone directory data stored in a pager of a paging system, and by transmission of a single message in the form of a DTMF signal by way of a telephone set.

Since a base station is arranged so as to continually receive telephone numbers of a plurality of pagers and a message and to sequentially and collectively page the pagers, the present invention also yields an advantage of providing the ability to continually send telephone numbers and a message without termination of a call and enabling the paging system to readily perform group broadcast transmission in a simple operation.

What is claimed is:

1. A selective pager comprising:

memory for storing data sets regarding telephone numbers of parties to be paged, each of said data sets being assigned a group identification code;

means for specifying a group identification code of parties to be paged;

means for selecting from the memory a plurality of telephone number data sets each of which has an assigned group identification code identical with the specified group identification code of parties to be paged;

means for generating a DTMF signal;

means for sequentially outputting the selected plurality of telephone number data sets to the DTMF signal generation means; and a speaker for converting into acoustic signals DTMF signals received from the DTMF signal generation means.

2. A selective pager comprising:

memory for storing data sets regarding telephone numbers of parties to be paged, each of said data sets being assigned a group identification code;

message memory for storing a plurality of transmission messages;

means for specifying a group identification code of parties to be paged;

means for specifying one of the plurality of transmission messages;

means for selecting from the memory a plurality of telephone number data sets each of which has an assigned group identification code identical with the specified identification code;

means for selecting the thus-specified transmission message from the message memory;

means for generating a DTMF signal;

means for sequentially outputting the selected plurality of telephone number data sets to the DTMF signal generation means; and a speaker for converting into acoustic signals DTMF signals received from the DTMF signal generation means.

3. A method of controlling transmission of a selective pager comprising the steps of:

storing into memory data sets regarding telephone numbers of receiving parties input from an operation section of the selective pager, each of said data sets being assigned a group identification code;

selecting from the memory a plurality of telephone number data sets each of which has an assigned group identification code identical with a group identification code of parties to be paged as specified by the operation section according to the group identification code;

sequentially converting the thus-selected plurality of telephone number data sets into DTMF signals; and converting the DTMF signals into acoustic signals.

4. A method of controlling transmission of a selective pager comprising the steps of:

storing into memory data sets regarding telephone numbers of received parties input from an operation section of the selective pager, each of said data sets being assigned a group identification code;

storing into message memory transmission messages input from the operation section;

selecting a plurality of telephone number data sets regarding the group of parties to be paged as specified by the operation section from the memory according to the group identification code;

selecting from the message memory the transmission message specified by the operation section;

sequentially and alternately converting the thus-selected plurality of telephone number data sets and the transmission message into DTMF signals; and converting the DTMF signals into acoustic signals.

5. A selective paging base station comprising:

means for receiving a plurality of telephone numbers from a single selective pager via a telephone line;

memory for storing said plurality of telephone numbers received from said single selective pager; and a radio transmission section which sequentially pages a plurality of selective pagers corresponding to the plurality of telephone numbers stored in the memory.

6. A selective paging base station comprising:

means for receiving a plurality of telephone numbers and at least one message from a single selective pager via a telephone line;

memory for storing the plurality of telephone numbers and said at least one message received from said single selective pager; and a radio transmission section that sequentially pages a plurality of selective pagers corresponding to the plurality of telephone numbers stored in the memory and that sequentially transmits said at least one message to said plurality of selective pagers.

7. A paging system comprising a plurality of selective pagers and at least one selective paging base station, wherein each of said selective pagers comprises:

memory for storing data sets regarding telephone numbers of parties, each of said data sets being assigned a group identification code;

means for specifying a group identification code of parties to be paged;

means for selecting from the memory a plurality of telephone number data sets each of which has an assigned group identification code identical with the specified group identification code of parties to be paged;

means for generating a DTMF signal;

means for sequentially outputting the selected plurality of telephone number data sets to the DTMF signal generation means; and a speaker for converting into acoustic signals DTMF signals received from the DTMF signal generation means, and wherein said selective paging base station comprises:

means for receiving a plurality of telephone numbers from any one of said plurality of selective pagers via a telephone line;

memory for storing said plurality of telephone numbers thus received; and a radio transmission section that sequentially pages plural selective pagers corresponding to the plurality of telephone numbers stored in the memory.

8. A paging system comprising a plurality of selective pagers and at least one selective paging base stations, wherein each selective pager comprises:

memory for storing data sets regarding telephone numbers of parties to be paged, each of said data sets being assigned a group identification code;

message memory for storing transmission messages;

means for specifying a group identification code of parties to be paged;

means for specifying one of the transmission messages;

means for selecting from the memory a plurality of telephone number data sets each of which has an assigned group identification code identical with the specified group identification code of parties to be paged;

means for selecting the thus-specified transmission message from the message memory;

means for generating a DTMF signal;

means for sequentially outputting the selected plurality of telephone number data sets to the DTMF signal generation means; and a speaker for converting into acoustic signals DTMF signals received from the DTMF signal generation means, and wherein said selective paging base station comprises:
 means for receiving telephone numbers via a telephone line;
 memory for storing a plurality telephone numbers thus received; and
 a radio transmission section that sequentially pages a plurality of selective pagers corresponding to the plurality of telephone numbers stored in the memory.

* * * * *